(12) United States Patent
Taniguchi et al.

(10) Patent No.: US 10,418,202 B2
(45) Date of Patent: Sep. 17, 2019

(54) PRODUCTION METHOD FOR A MEMBRANE SWITCH MEMBER

(71) Applicant: NISSHA CO., LTD., Kyoto (JP)

(72) Inventors: Chuzo Taniguchi, Shiga (JP); Masayuki Kyoumen, Osaka (JP); Toshitsugu Fujimura, Kyoto (JP); Takenori Yoshida, Kyoto (JP); Isao Yamamoto, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 184 days.

(21) Appl. No.: 15/539,804

(22) PCT Filed: Apr. 28, 2016

(86) PCT No.: PCT/JP2016/063489
§ 371 (c)(1),
(2) Date: Sep. 11, 2017

(87) PCT Pub. No.: WO2016/208278
PCT Pub. Date: Dec. 29, 2016

(65) Prior Publication Data
US 2017/0372853 A1    Dec. 28, 2017

(30) Foreign Application Priority Data

Jun. 24, 2015  (JP) .................. 2015-126730

(51) Int. Cl.
*H01H 11/04* (2006.01)
*H01H 11/00* (2006.01)
*H01H 13/704* (2006.01)

(52) U.S. Cl.
CPC ........... *H01H 11/045* (2013.01); *H01H 11/00* (2013.01); *H01H 11/0012* (2013.01);
(Continued)

(58) Field of Classification Search
CPC .. H01H 11/045; H01H 11/00; H01H 11/0012; H01H 11/0056; H01H 13/704
See application file for complete search history.

(56) References Cited

FOREIGN PATENT DOCUMENTS

| JP | 2630693 | 4/1997 |
|---|---|---|
| JP | 2015-22906 | 2/2015 |

OTHER PUBLICATIONS

International Search Report dated Jun. 28, 2016 in International (PCT) Application No. PCT/JP2016/063489.

*Primary Examiner* — Livius R. Cazan
(74) *Attorney, Agent, or Firm* — Wenderoth, Lind & Ponack, L.L.P.

(57) ABSTRACT

A method for manufacturing a membrane switch member that can be manufactured easily and that can be caused to function as an electrostatic sensor even when a protruding portion is pressed. Injection molding by injecting a material including a supercritical fluid gas and a resin material in a mixed state; and, after the injection molding, removing a first mold from a second mold, causing gas produced within the injection molded resin to grow in concave portions, thereby causing the concave portions to invert to a protruding state; and manufacturing a membrane switch member in which voids are formed between the protruding portions and a molding resin layer, and portions other than the portions corresponding to the protruding portions are adhered to the resin layer by an adhesion layer.

4 Claims, 19 Drawing Sheets

(52) U.S. Cl.
CPC ...... _H01H 11/0056_ (2013.01); _H01H 13/704_ (2013.01); _H01H 2209/002_ (2013.01); _H01H 2229/044_ (2013.01); _H01H 2229/047_ (2013.01)

PRODUCTION METHOD FOR A MEMBRANE SWITCH MEMBER

TECHNICAL FIELD

The present invention relates to a method for manufacturing a membrane switch member to which a membrane switch sheet and a substrate are fixed.

BACKGROUND ART

Conventionally, a variety of structures are known as methods for manufacturing this type of membrane switch member. For example, as illustrated in FIG. 19, a method for manufacturing a membrane switch member 105 is known in which a membrane switch sheet 103 includes a flat portion 101 and a protruding portion 102, and a resin layer 104 is fused only to a back face of the flat portion of the membrane switch sheet 103 (e.g. see Patent Literature 1).

CITATION LIST

Patent Literature

Patent Literature 1: Japanese Patent No. 2630693
Patent Literature 2: Japanese Unexamined Patent Application Publication No. 2015-022906A

SUMMARY OF INVENTION

Technical Problem

However, with the structure described above, the resin layer 104 is not provided on an inner face (back face) of the protruding portion 102 of the membrane switch sheet 103. As such, in cases, for example, where a capacitive touch panel is disposed on the inner face of the membrane switch sheet 103 and the protruding portion 102 is pressed down, there are problems in that it is not possible to press the capacitive touch panel via the resin layer and it is not possible to detect changes in electrostatic capacitance in the capacitive touch panel. Even if the capacitive touch panel is disposed on the inner faces of each of the flat portion and the protruding portion 102, the wiring of the capacitive touch panel does not elongate and cannot be caused to conform to the curved face of the protruding portion 102. Consequently, proposals have been made in which only the protruding portion 102 is configured as a mechanical switch (see Patent Literature 2), but the presence of both a capacitive touch panel and a mechanical switch leads to complications in manufacturing.

Therefore, an object of the present invention is to solve the problems described above and provide a method for manufacturing a membrane switch member that can be easily manufactured and that can be caused to function as a switch of a capacitive touch panel even when a protruding portion is pressed in a state where the capacitive touch panel is disposed on the inner face of the membrane switch sheet.

Solution to Problem

The present invention is configured as follows to achieve the object described above.

According to one aspect of the present invention, a method for manufacturing a membrane switch member is provided that includes:

closing a pair of molds in a state where a membrane switch sheet including a protruding portion on a front face and an adhesive layer on a back face in portions other than portions corresponding to the protruding portion is disposed such that the protruding portion contacts a convex portion cavity forming face of a first mold of the pair of molds such that the front face of the membrane switch sheet is retained on a mold inner face in a state where the protruding portion is inverted to a concave portion, and a second mold forms a cavity between the back face of the membrane switch sheet and a mold inner face;

injection molding by injecting a material including a supercritical fluid gas and a resin material in a mixed state into the cavity of the closed pair of molds; and after the injection molding, releasing the mold clamping and removing the first mold from the second mold and causing gas produced within the injection molded resin to grow in the concave portion, thereby causing the protruding portion of the membrane switch sheet to re-invert from the state inverted to the concave portion to a protruded protruding state, and manufacturing a membrane switch member in which a void is formed between the protruding portion and an injection molded and cooled-solidified resin layer and the portions other than the portions corresponding to the protruding portion are adhered to the resin layer by the adhesion layer.

Advantageous Effects of the Invention

According to the aspect of the present invention, injection molding is performed by injecting a material including a supercritical fluid gas and a resin material in a mixed state and, after the injection molding, the first mold is removed from the second mold. As a result, the gas produced within the molten resin can be caused to grow between the protruding portion and the molded resin layer and form a void. Thus, due to the void, a membrane switch member can be easily manufactured for which a stroke whereby the protruding portion can be sufficiently pressed down by pressing force can be sufficiently ensured. By attaching an electrostatic switch to the substrate of this membrane switch member, this membrane switch member can be caused to function as an electrostatic switch type membrane switch.

DESCRIPTION OF EMBODIMENTS

Figure 1:
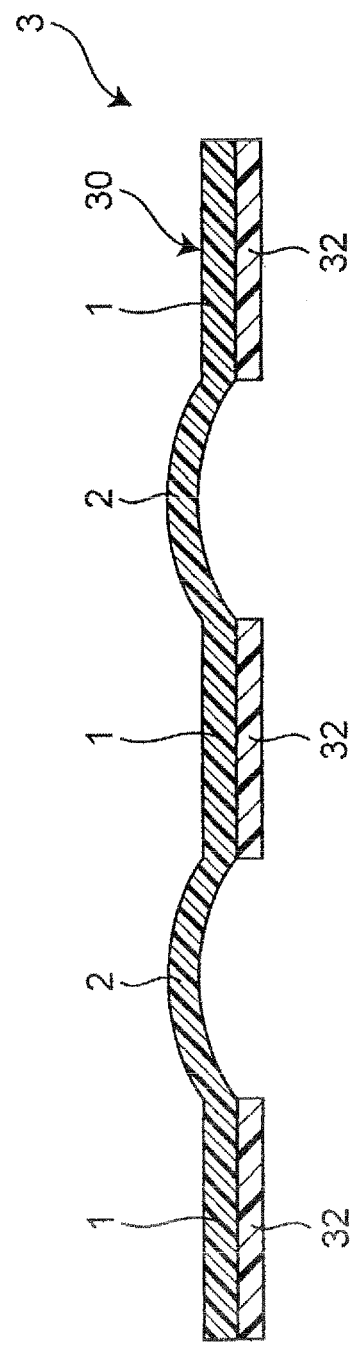
FIG. 1 is an explanatory drawing of a membrane switch sheet used in a method for manufacturing a membrane switch member according to an embodiment of the present invention.

Hereinafter, a method for manufacturing a membrane switch member according to an embodiment of the present invention is described in detail while referring to the drawings.

First, as illustrated in FIG. 1, a membrane switch sheet 3 used in the method for manufacturing a membrane switch member according to the embodiment of the present invention includes a base film 30 that includes flat portions 1 and a plurality of semi-spherical or dome shaped protruding portions 2 interdisposed with the flat portions 1. An adhesive layer 32 is formed on a back face of the base film 30 at portions corresponding to the flat portions 1, that is, at portions other than portions corresponding to the protruding portions 2. The adhesive layer 32 is not formed on the back face at portions corresponding to the protruding portions 2.

The base film 30 is made from a polymer-based material or the like such as polyethylene terephthalate, polycarbonate, polypropylene, polyethylene, or nylon. From the perspective of maintaining a membrane switch click feeling, it is more preferable that the base film 30 be made from polyethylene terephthalate. In cases where a membrane switch sheet 3 with an embossed front face is to be used, a matte film may be used as the base film 30, or, alternatively, a flat film provided with an embossing pattern using an embossing roll may be used as the base film 30.

A design layer may be disposed on the base film 30 as necessary. The design layer is a layer in which characters, symbols, or the like are formed by printing, vapor deposition, or the like and, as necessary, a print design of an uneven pattern may be formed. Additionally, in another example, the base film 30 may be configured from a metallic or woodgrain pattern layer that blends with surrounding panels when dark, and through which a character section can be recognized when lit using a back light.

The adhesive layer 32 is provided on the portions corresponding to the back face of the flat portions 1 of the base film 30 by printing or the like. The adhesive layer 32 is a layer for more strongly fusing the membrane switch sheet 3 to a resin molded substrate 20. The adhesive layer 32 is constituted of an epoxy, phenol, polyester, urethane, acrylic, or similar thermosetting resin, or a vinyl chloride, urethane, acrylic, or similar thermoplastic resin. A resin with heat sensitivity or pressure sensitivity suited to the resin of the substrate 20 is appropriately selected and used.

The protruding portions 2 of the membrane switch sheet 3 are out-of-mold formed by a vacuum forming method, an embossing method, or the like, and are preferably formed in a protruding, three-dimensional shape such as a dome shape. The membrane switch sheet 3 may be a label-like sheet cut or punched out in a predetermined shape, or may be an elongated sheet.

Next, a method for manufacturing a membrane switch member 35 is described in which the substrate 20 is formed using the out-of-mold formed membrane switch sheet 3 that includes the protruding portions 2 and the flat portions 1 and, at the same time, the membrane switch sheet 3 is adhered to the front face of the substrate 20 by the adhesive layer 32 and a void 21 is formed on the back face side of each of the protruding portions 2.

Figure 2:
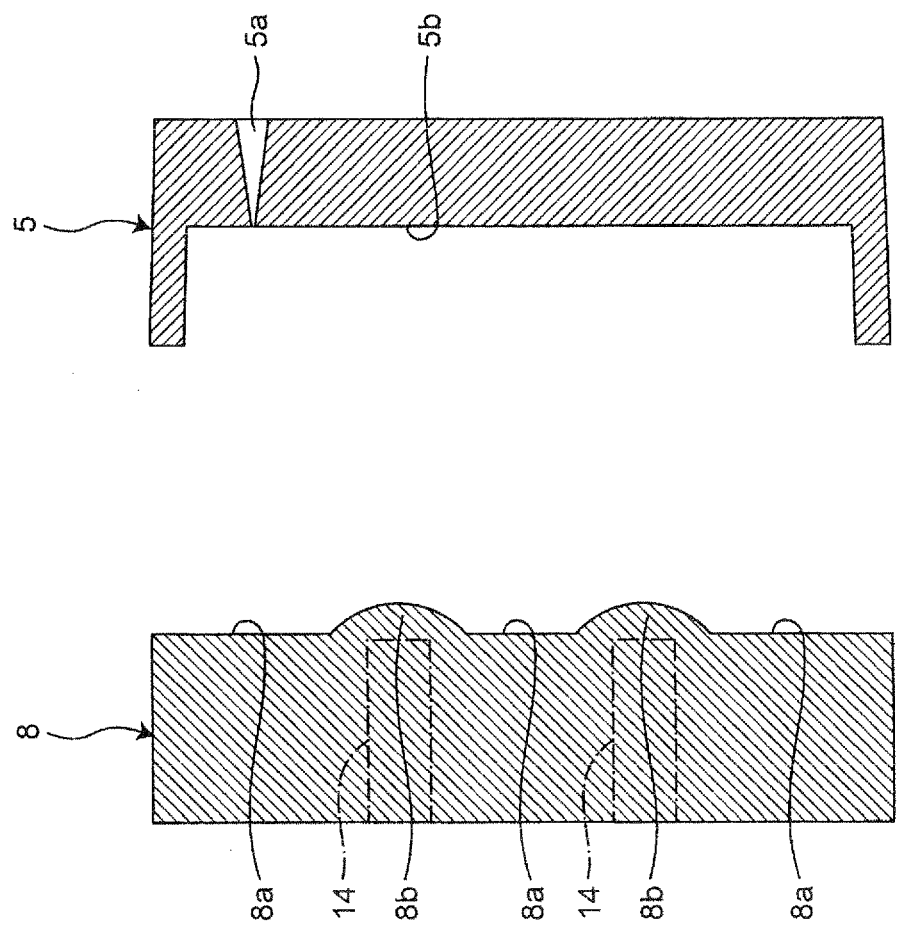
FIG. 2 is a cross-sectional side view of molding molds used in the method for manufacturing a membrane switch member.
Figure 3:
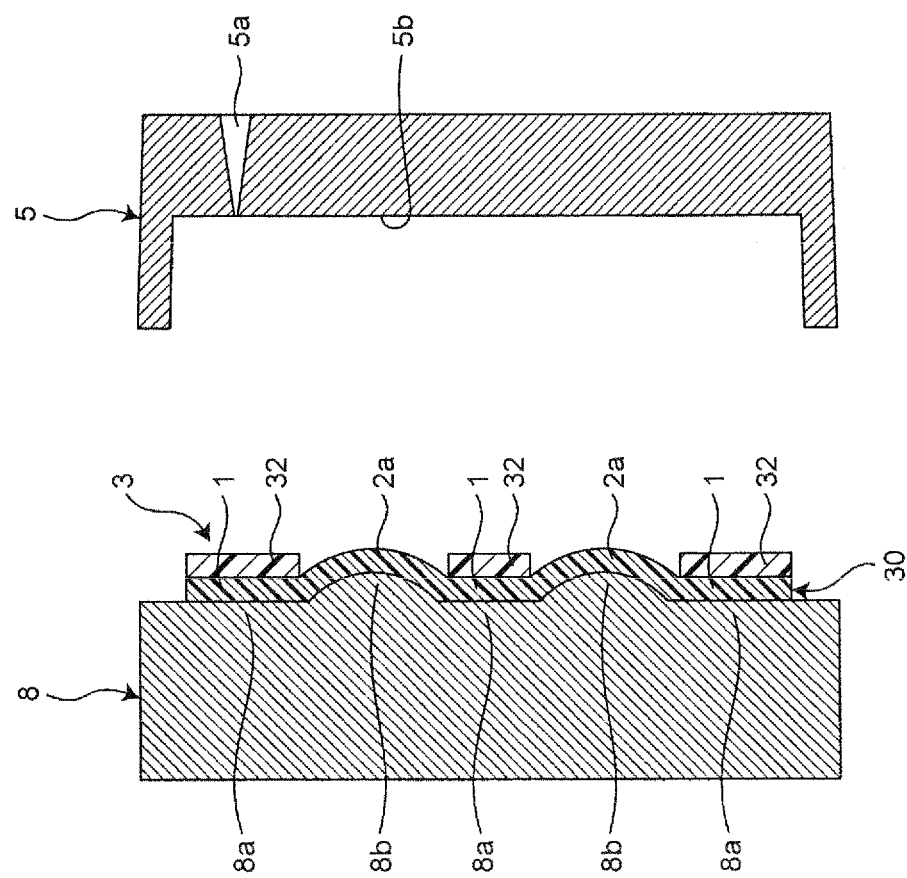
FIG. 3 is a process drawing of the method for manufacturing a membrane switch member.

As illustrated in FIGS. 2 and 3, an injection molding mold used in this method is constituted from a pair of molds, specifically, a movable mold 8 and a fixed mold 5.

The movable mold 8 includes a semi-spherical or dome-shaped convex portion cavity forming face 8b and a flat portion cavity forming face 8a. The convex portion cavity forming face 8b inverts the protruding portions 2 on the front face side of the membrane switch sheet 3 and supports the protruding portions 2 in a convex portion 2a state. The flat portion cavity forming face 8a supports the flat portions 1 on the front face side of the membrane switch sheet 3. As necessary, suction passages (described later) may be formed in the convex portion cavity forming face 8b and the flat portion cavity forming face 8a, and the protruding portions 2 and the flat portions 1 on the front face side of the membrane switch sheet 3 may be suctioned thereto.

The fixed mold 5 includes a substrate cavity concave portion 5b for molding the plate-like substrate 20, and a gate 5a in communication with the substrate cavity concave portion 5b. The convex portion cavity forming face 8b and the flat portion cavity forming face 8a of the movable mold 8 are insertable into the substrate cavity concave portion 5b with the membrane switch sheet 3 disposed therebetween.

Figure 4:
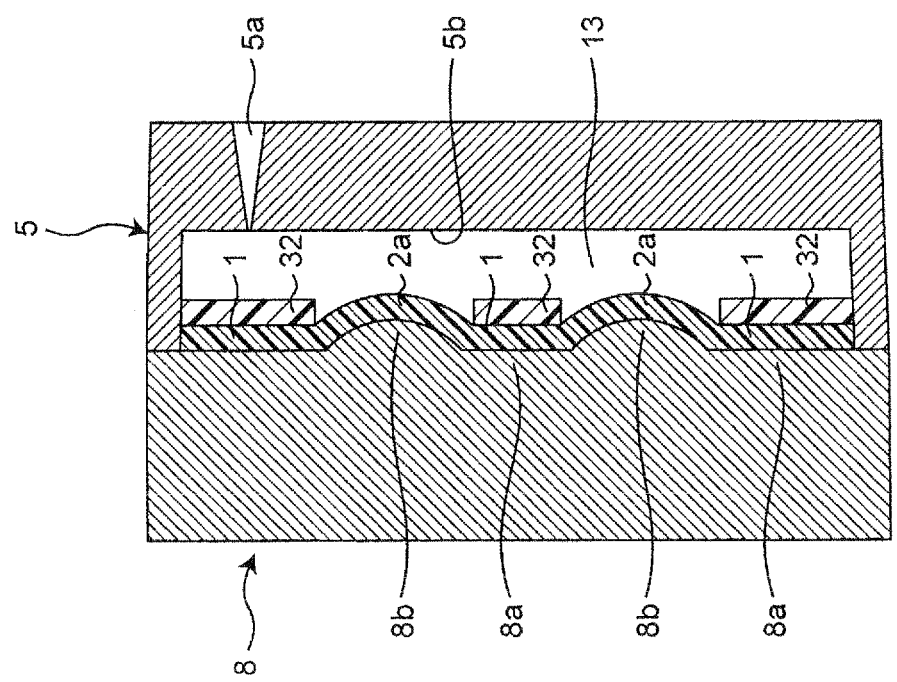
FIG. 4 is a process drawing of the method for manufacturing a membrane switch member.

Next, as illustrated in FIG. 4, the fixed mold 5 and the movable mold 8 are clamped, the convex portion cavity forming face 8b and the flat portion cavity forming face 8a of the movable mold 8 are inserted into the substrate cavity concave portion 5b of the fixed mold 5 with the membrane switch sheet 3 disposed therebetween, and the membrane switch sheet 3 is sandwiched between the fixed mold 5 and the movable mold 8. At this time, a substrate forming cavity 13 is constituted by the inner face of the substrate cavity concave portion 5b and by the adhesive layer 32 of the flat portion back face and the back face of the convex portion 2a of the membrane switch sheet 3.

Figure 5:
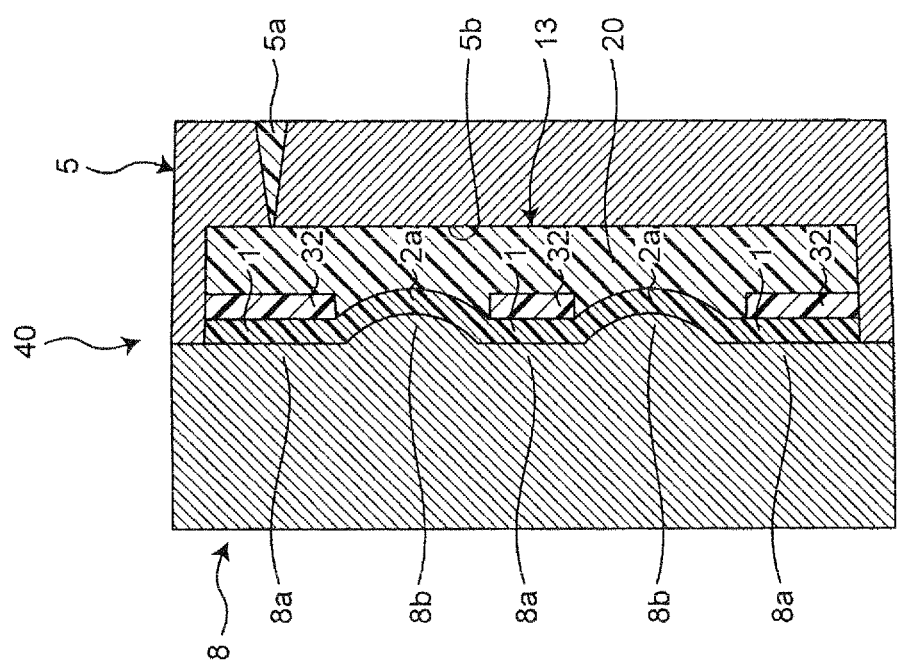
FIG. 5 is a process drawing of the method for manufacturing a membrane switch member.

Next, as illustrated in FIG. 5, molding resin is injected and charged through the gate 5a into the cavity 13 that is defined as a result of the fixed mold 5 and the movable mold 8 being clamped. As a result, the substrate 20 is injection-formed and, at the same time, the substrate 20 is adhered to the membrane switch sheet 3 by the adhesive layer 32.

Here, the injection molding performed using an injection molding mold 40 constituted by the fixed mold 5 and the movable mold 8 is microfoam molding (Micro Cellular Foam (MCF) or Micro Cellular Plastics (MCP)). Microfoam molding is a technique in which a single phase solution is formed by mixing carbon dioxide or nitrogen in a supercritical state with a resin, and then performing injection molding using this solution. As a result, plastic products of a fine foamed state (from 5 to 200 microns) can be formed.

Figure 6:
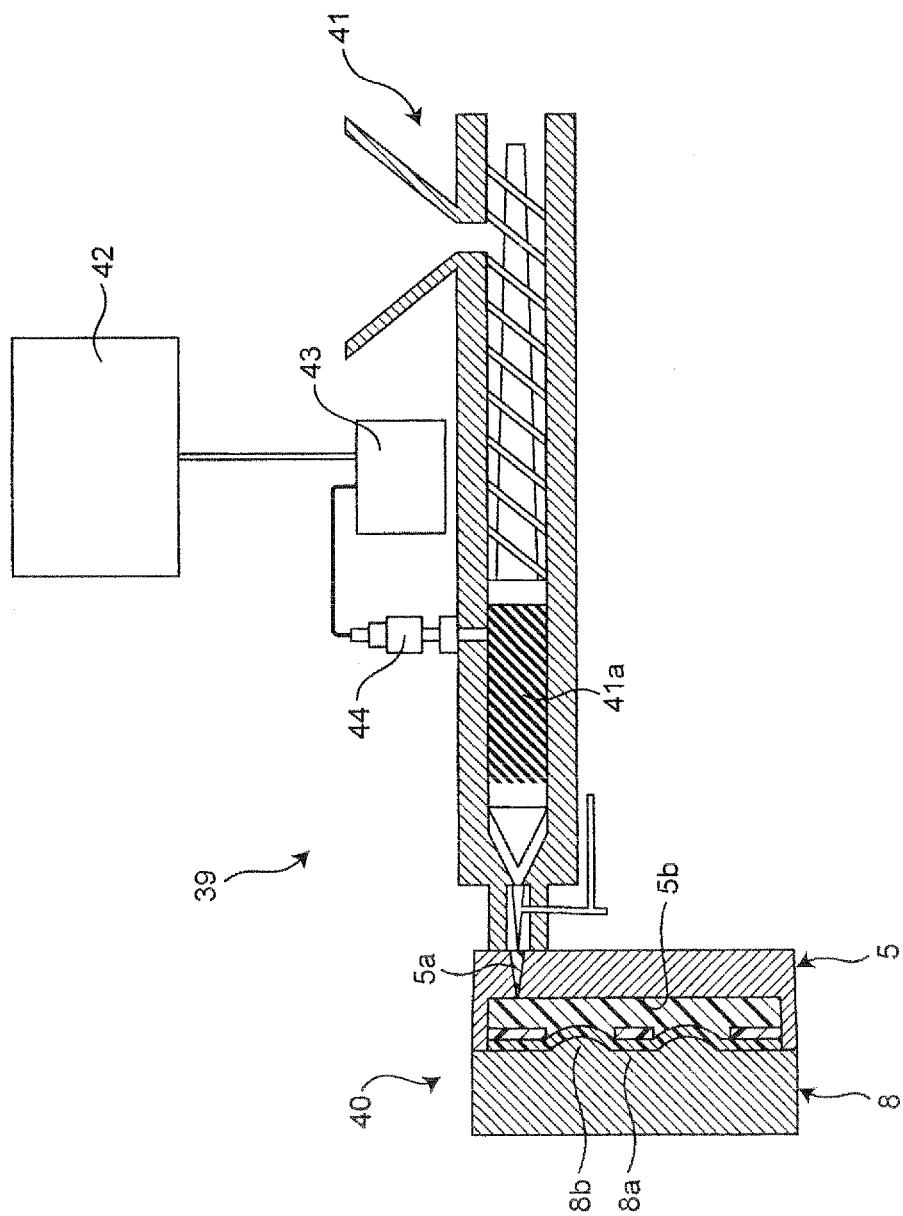
FIG. 6 is a process drawing of the method for manufacturing a membrane switch member.

As illustrated in FIG. 6, this microfoam molding is performed using a membrane switch sheet manufacturing device 39.

The membrane switch sheet manufacturing device is provided with the injection molding mold 40 constituted by the molds 5 and 8, an injection molder 41, a supercritical fluid generator 42 of carbon dioxide or nitrogen in a supercritical state, and a supercritical fluid injector 43 including an injection unit 44 that supplies the supercritical fluid to a mixing area 41a in a leading portion on an injection side of the injection molder 41. The foaming agent that is a gas is pressurized at the supercritical fluid generator 42, thereby causing a supercritical fluid to be produced, which is sent to the supercritical fluid injector 43 at a constant flow rate. The supercritical fluid injector 43 adjusts the pressure of the supercritical fluid supplied from the supercritical fluid generator 42 depending on the pressure in a barrel of the injection molder 41, and injects this supercritical fluid from the injection unit 44 into the mixing area 41a in the leading portion on the injection side of the injection molder 41 for a predetermined period of time. The supercritical fluid injected into the injection molder 41 is dispersed and mixed into the molten resin as fine droplets of the supercritical fluid using the barrel and screw of the injection molder 41. Thus, a single phase melt is formed. Here, the back pressure at the time of metering and after metering is held at or above a set level, and the supercritical fluid is prevented from separating from the single phase melt. Then, the single phase melt is injected from the injection molder 41 into the cavity 13 of the molds 5 and 8, through the gate 5a of the fixed mold 5 of the injection molding mold 40.

A large number of gas bubbles are produced in the single phase melt due to a sudden drop in pressure when the single phase melt injected into the cavity 13 passes through the nozzle of the injection molder 41 or the gate 5a of the fixed mold 5, while this single phase melt is charged into the cavity 13. The entire single phase melt is in a uniformly foamed state within the cavity 13.

The molding resin used here is the resin that will function as the substrate 20 of the membrane switch member 35. Examples of the molding resin include polycarbonate (PC), polymethyl methacrylate (PMMA), acrylonitrile butadiene styrene (ABS), propylene (PP), polystyrene (PS), polycarbonate/acrylonitrile butadiene styrene (PC/ABS), and the like.

After the injection molding, the movable mold 8 is moved with respect to the fixed mold 5 and the mold is opened. At this time, if the mold is opened before the molded product has sufficiently cooled, the center portion of the plate or portions that have not sufficiently cooled may not sufficiently solidify. In such a case, defects will occur. That is, gas bubbles will break at these portions due to the gas pressure within the gas bubbles, which will cause pre-blistering. On the other hand, if too much time is taken for the cooling, the gas bubbles produced at the time of mold opening due to the releasing of internal pressure will be few and, consequently, the voids 21 will not be formed. Preferably, cooling time is set to from 10 to 50 seconds and more preferably is set to from 20 to 40 seconds.

Figure 7:
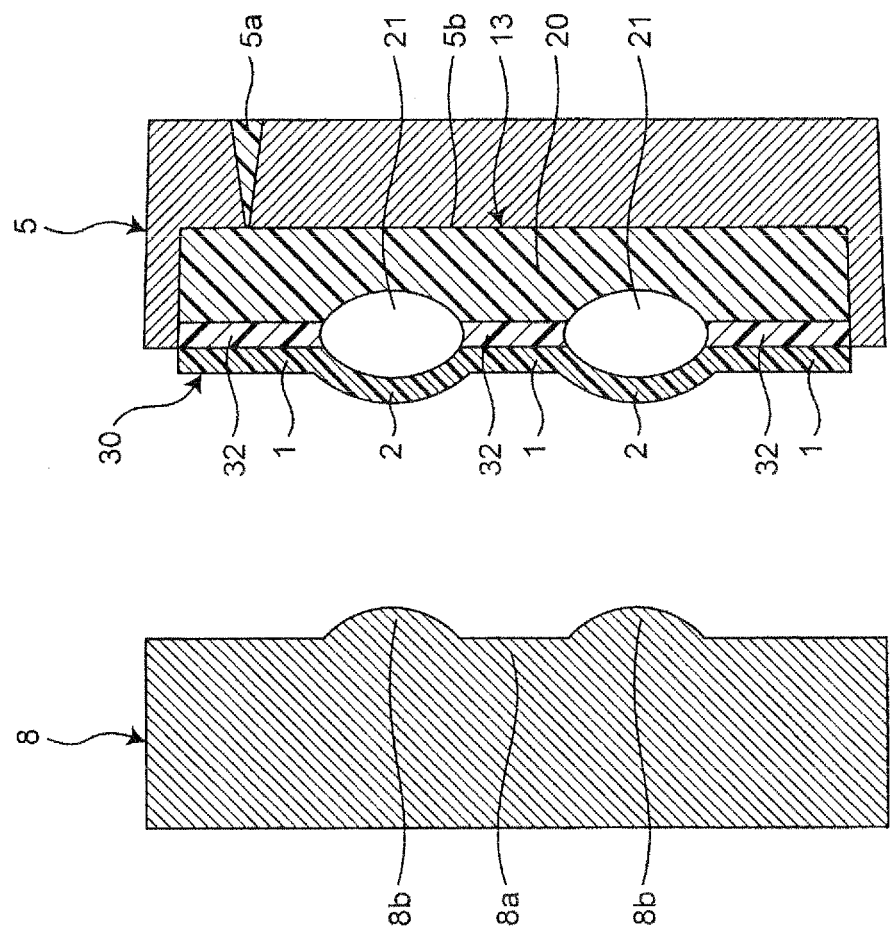
FIG. 7 is a process drawing of h method for manufacturing a membrane switch member.

At the time of mold opening, the pressure that had been applied to the molten resin suddenly drops and, as a result, the gas bubbles in the molten resin grow and increase in volume. The growth of the gas bubbles occurs throughout the entire surface of the substrate 20 but, at the portions where the adhesive layer 32 is present, the molten resin and the sheet 3 are strongly fixed by the adhesive layer 32. Thus, as illustrated in FIG. 7, the gas bubbles concentrate in the portions where the adhesive layer 32 is not present, that is, in the back face of the concave portions 2a, and the gas bubbles grow at the back face of the concave portions 2a. As a result, spherical or elliptical voids 21 are formed between the molten resin layer that becomes the substrate 20 and the back face of the concave portions 2a and the concave portions 2a are inverted such that the protruding portions 2 are in a protruding state. The growth of the gas bubbles stops when the resin of the substrate 20 cools and solidifies. When the gas bubble growth stops, the volume of the void 21 becomes fixed. As an example, the volume of the voids 21 becomes fixed by allowing the substrate 20 to sit at rest for about one day after the injection molding.

Figure 8:
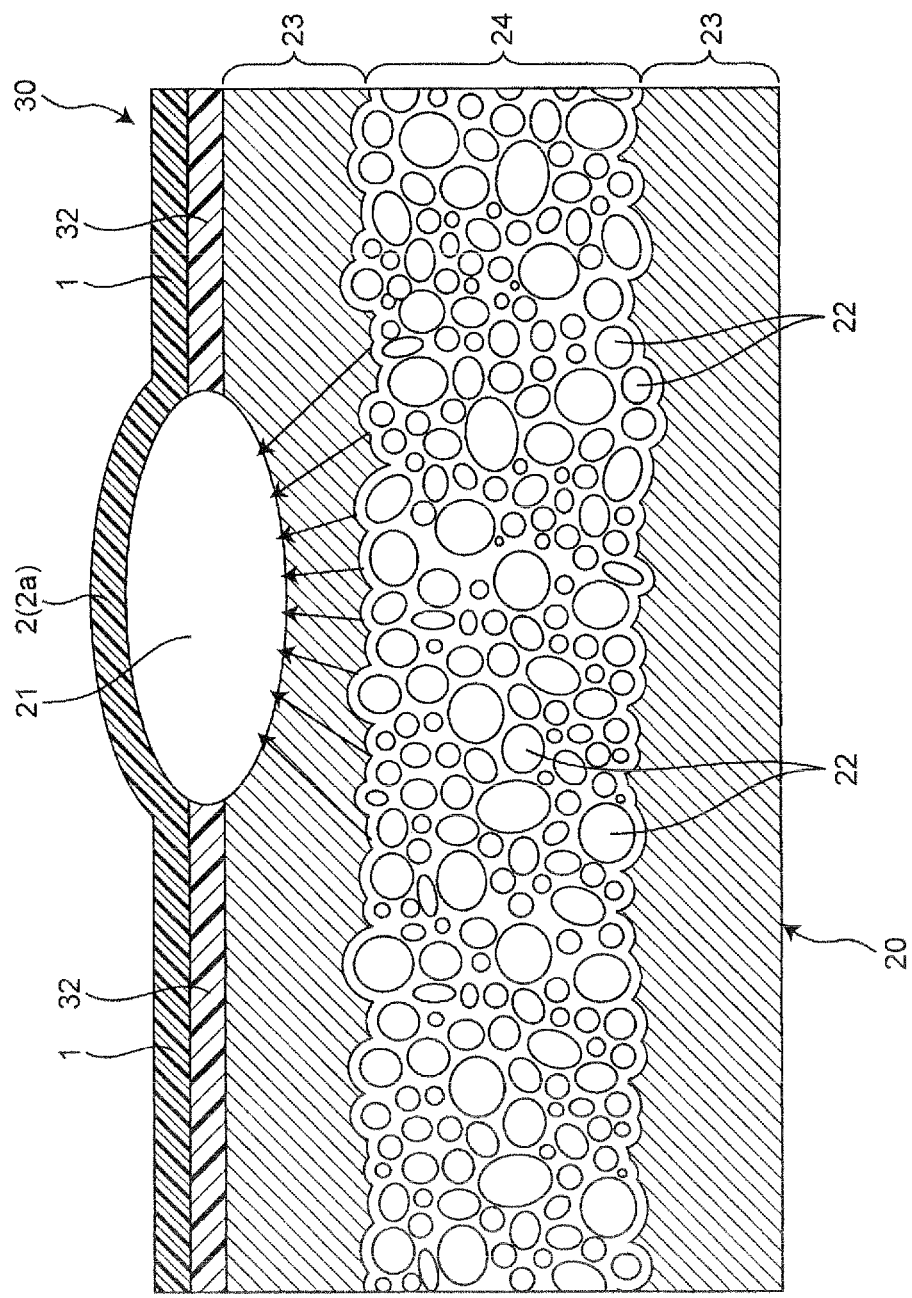
FIG. 8 is an explanatory drawing of the growth of gas bubbles in the process of the method for manufacturing a membrane switch member.

Here, as illustrated in FIG. 8, the molded product of the substrate 20 has a sandwich structure including a solid skin layer (or simply "skin layer") 23 substantially free of gas bubbles 22 on the upper edge portion and the lower edge portion, and a core layer 24 containing a large number of the gas bubbles 22 in the middle portion. The portion to which the adhesive layer is adhered is the solid skin layer 23 and, as such, there will be no reductions in adhesion area because there are hardly any of the gas bubbles 22 in the solid skin layer 23.

Figure 9:
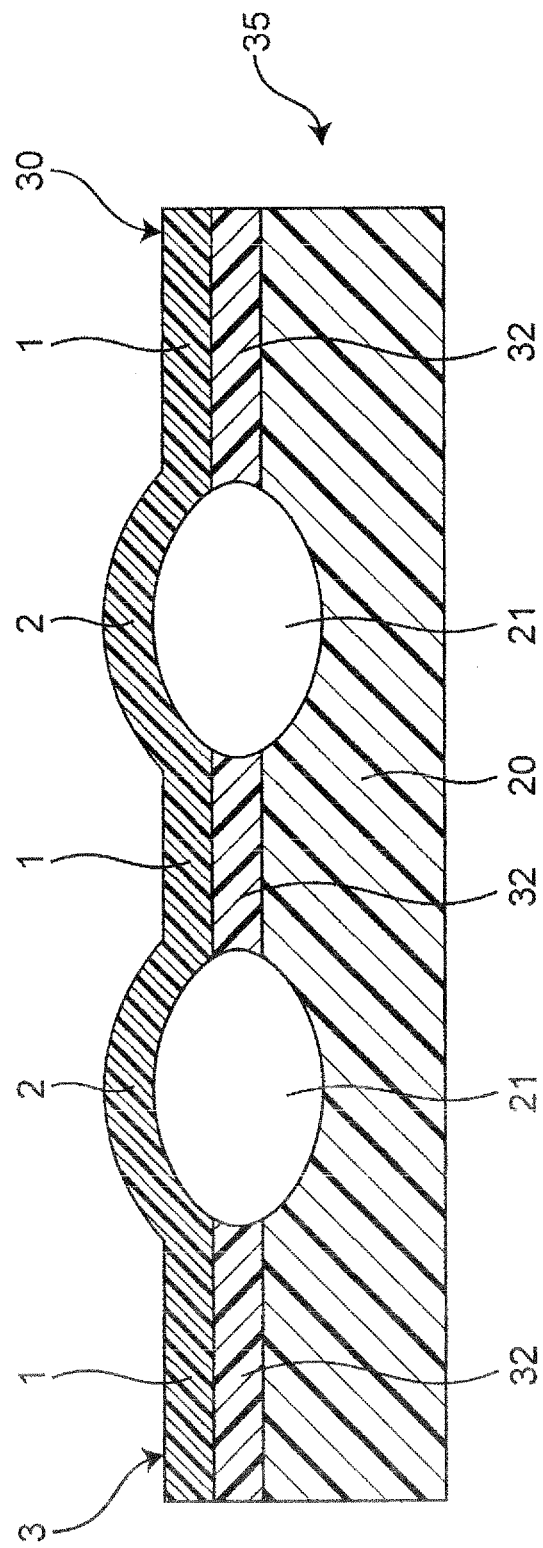
FIG. 9 is a process drawing of the method for manufacturing a membrane switch member.
Figure 10:
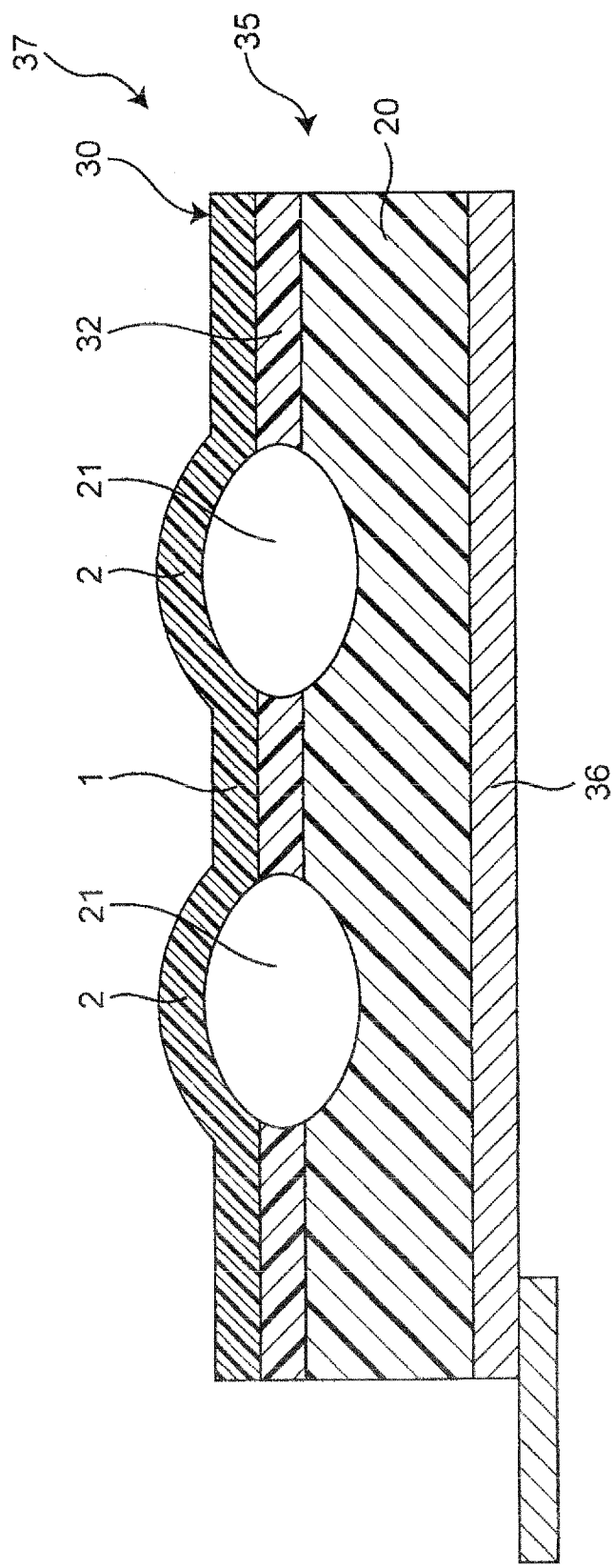
FIG. 10 is an explanatory drawing of a membrane switch.

As illustrated in FIG. 9, the membrane switch member 35 is removed from the fixed mold 5 after waiting for the cooling-solidification of the molded product of the substrate 20 to complete.

A membrane switch provided with an electrostatic sensor 37 is obtained by attaching a capacitive touch panel or similar electrostatic sensor 36 to a bottom face of the substrate 20 of the membrane switch member 35.

Figure 11:
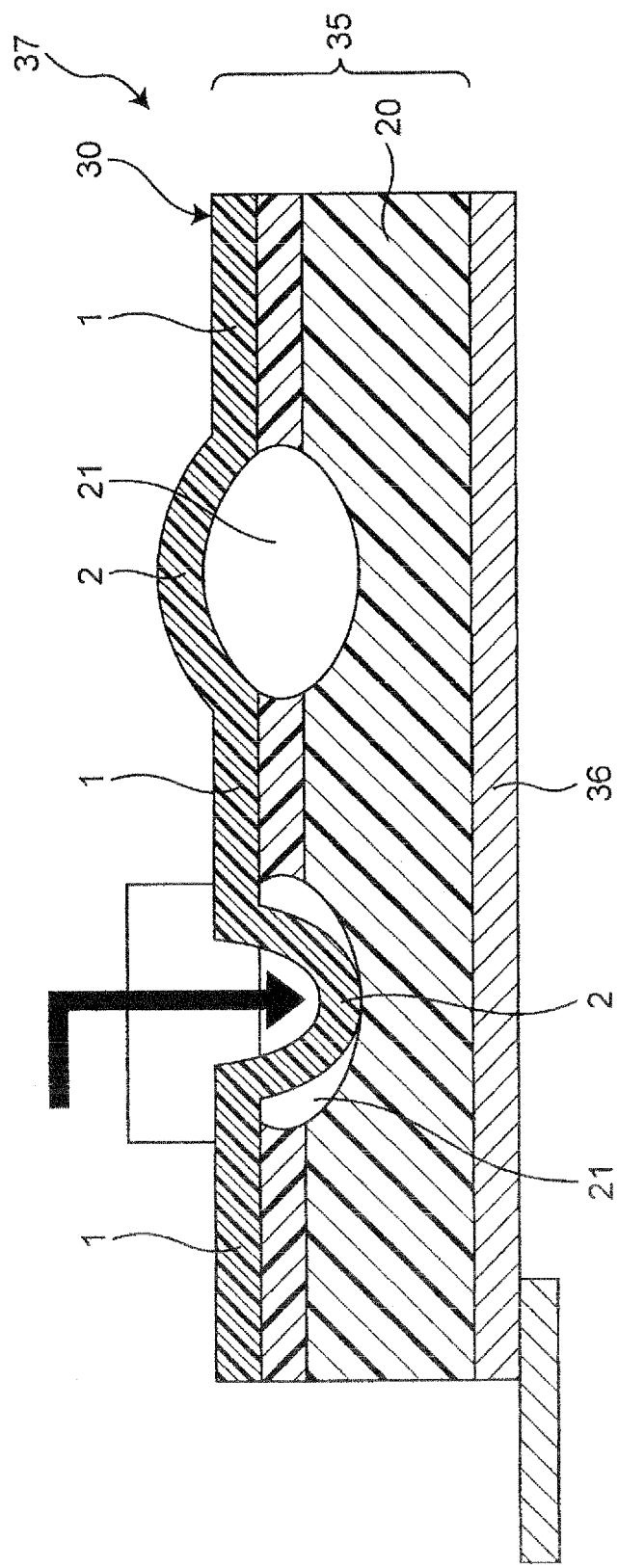
FIG. 11 is a drawing for explaining the operations of the membrane switch.

As illustrated in FIG. 11, with this membrane switch provided with an electrostatic sensor 37, when the protruding portion 2 that functions as a button is pressed and the protruding portion 2 is pressed down to the bottom of the void 21, thus pressing on the substrate 20, the surface of the electrostatic sensor 36 is pressed, the electrostatic capacitance changes, and this change is detected by the electrostatic sensor 36.

Figure 12:
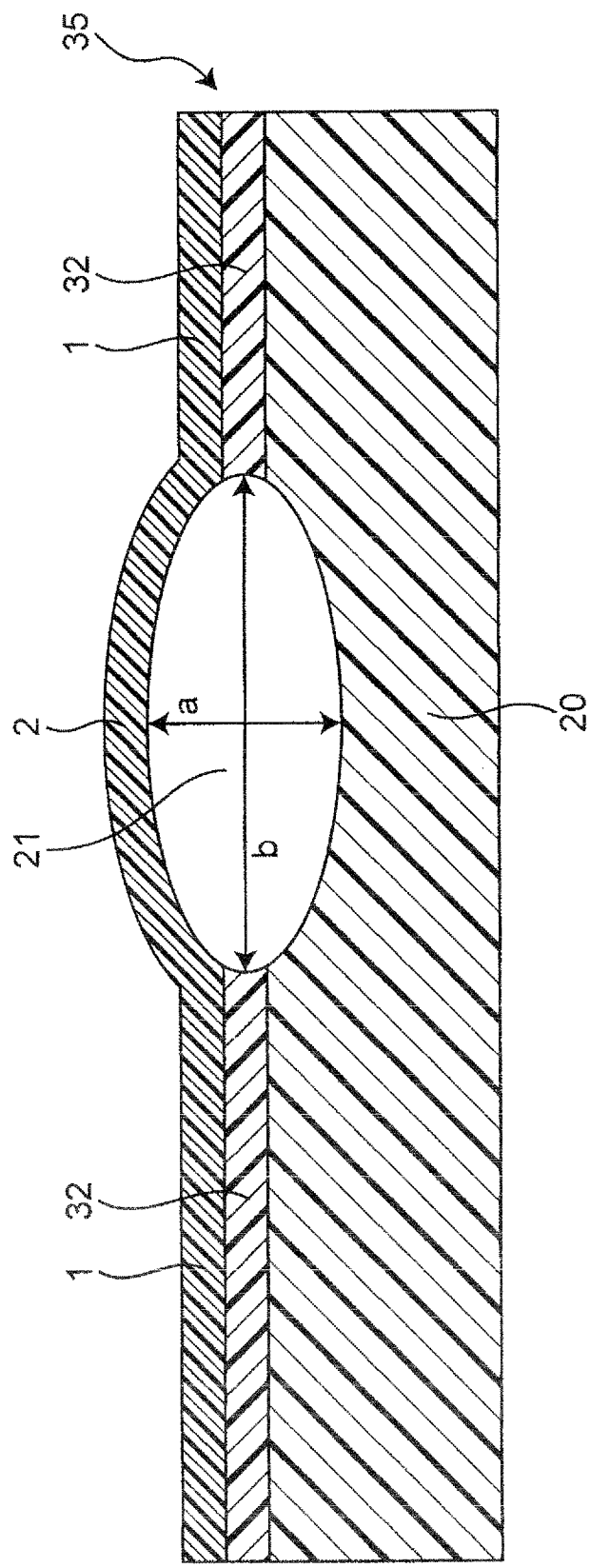
FIG. 12 is an explanatory drawing of an example of a void under a protruding portion.

Here, as illustrated in FIG. 12, in an example of the void 21 under the protruding portion 2, a height a of the void 21 is from 0.2 to 0.7 mm, and a size b of the void 21 is from 5 to 20 mm in length and from 5 to 40 mm in width.

Figure 13:
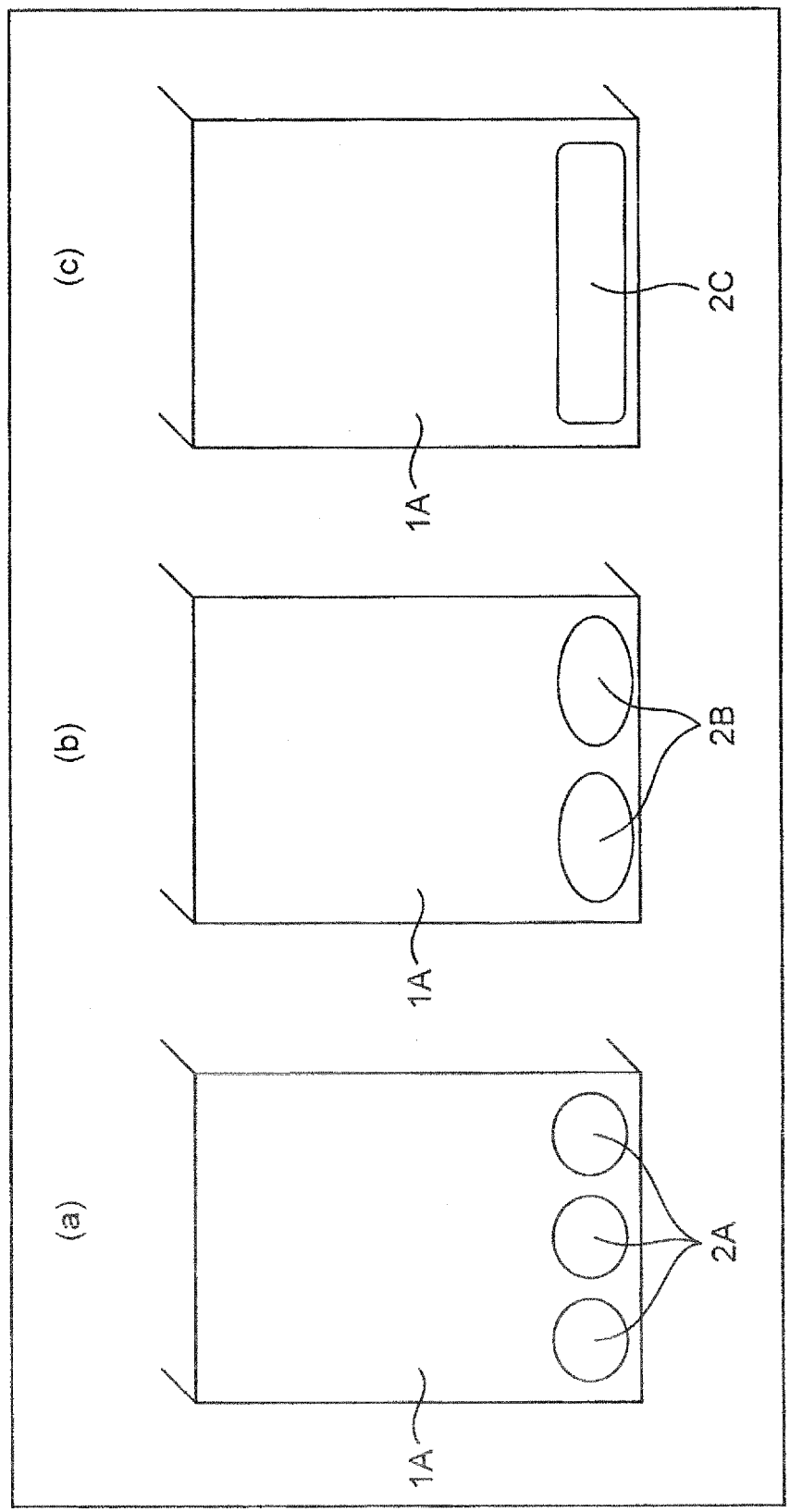
FIGS. 13A to 13C are explanatory drawings of product shapes of membrane switches provided with electrostatic sensors.

As illustrated in each of FIGS. 13A, 13B, and 13C, in examples of product shapes of the membrane switch provided with an electrostatic sensor 37, the protruding portion 2 may be formed as a round button 2A, an elliptical button 2B, or a rectangular button 2C. Portions 1A other than the buttons are illustrated as flat portions, but may also be caused to function as electrostatic sensor input units.

According to this embodiment, the injection molding is performed by injecting a material including a supercritical fluid gas and a resin material in a mixed state and, after the injection molding, the first mold 8 is removed from the second mold 5. As a result, the gas bubbles 22 produced within the molten resin can be caused to grow between the protruding portions 2 and the molded resin layer, namely the substrate 20, and form the voids 21. Thus, due to the voids 21, a membrane switch member 35 can be easily manufactured for which a stroke whereby the protruding portions 2 can be sufficiently pressed down by pressing force can be ensured and a click feeling can be obtained. By attaching an electrostatic sensor 36 to the substrate 20 of this membrane switch member 35, the membrane switch member 35 can be caused to function as a membrane switch provided with an electrostatic sensor 37. Examples of methods for attaching the electrostatic sensor 36 to the substrate 20 include attaching the electrostatic sensor 36 to the substrate 20 in a separate process after the molding, and fixing the electrostatic sensor 36 to the substrate 20 at the same time as the time of injection molding the substrate 20.

Additionally, due to the fact that the voids 21 are formed on the inner face side of the pre-formed semi-spherical or dome shaped protruding portions a stroke whereby the protruding portion 2 can be pressed down can be sufficiently ensured and a click feeling can be obtained. If this type of semi-spherical or dome shaped protruding portion 2 is not provided and the void 21 is simply formed in flat portions where the adhesive layer 32 is not provided, the semi-spherical or dome shaped protruding portion will not be formed, the press-down stroke cannot be sufficiently ensured and, consequently, click feeling cannot be obtained.

Note that the present invention is not limited to this embodiment and various other aspects can be implemented.

Figure 14:
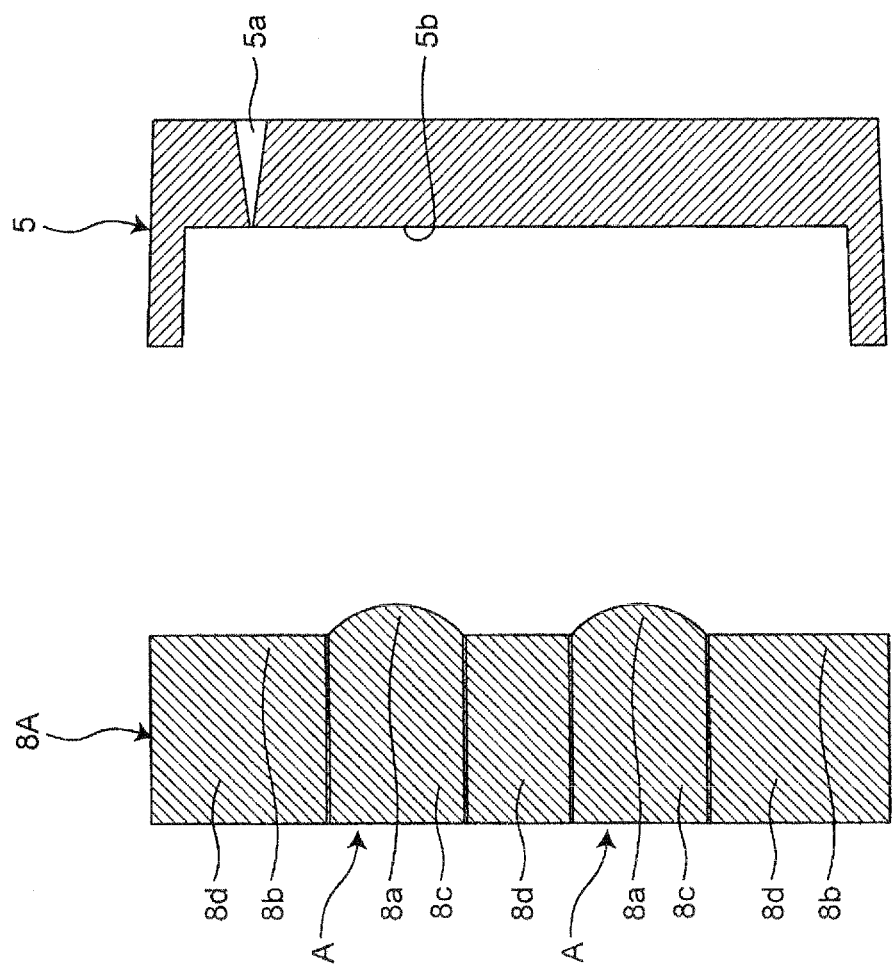
FIG. 14 is a process drawing of a method for manufacturing a membrane switch member according to a modified example of the embodiment of the present invention.

For example, a configuration is possible in which a movable mold 8A has a protruding portion end extrusion structure. As illustrated in FIG. 14, the movable mold 8A has a configuration including extrusion portions 8c that include a protruding portion 8a on a leading end thereof, and a movable main body portion 8d. Each of the extrusion portions 8c are movable with respect to the movable main body portion 8d between a protruding position A depicted in FIG. 14 and a retreated position B (described later).

Figure 15:
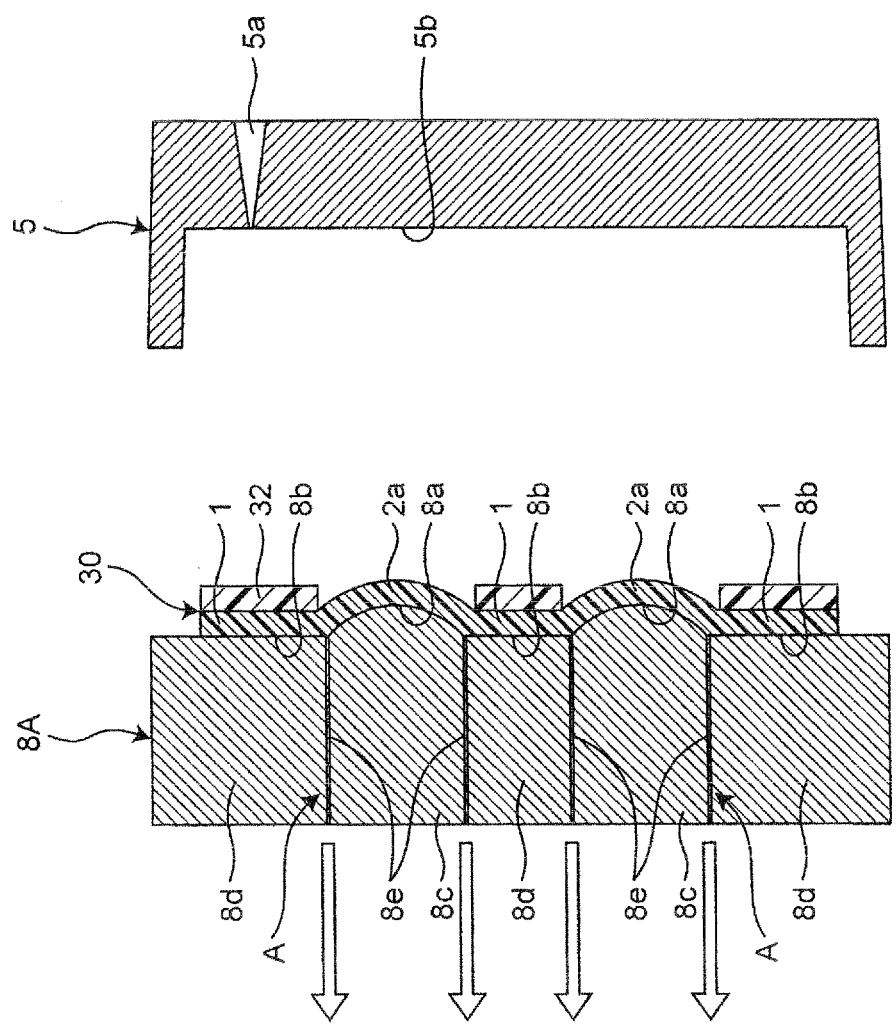
FIG. 15 is a process drawing of the method for manufacturing a membrane switch member according to the modified example.

Additionally, as illustrated in FIG. 15, gaps between each of the extrusion portions 8c and the movable main body portions 8d are used as suction passages 8e and suction is performed. As a result, the membrane switch sheet 3 can be suction-retained to the movable mold 8A.

Figure 16:
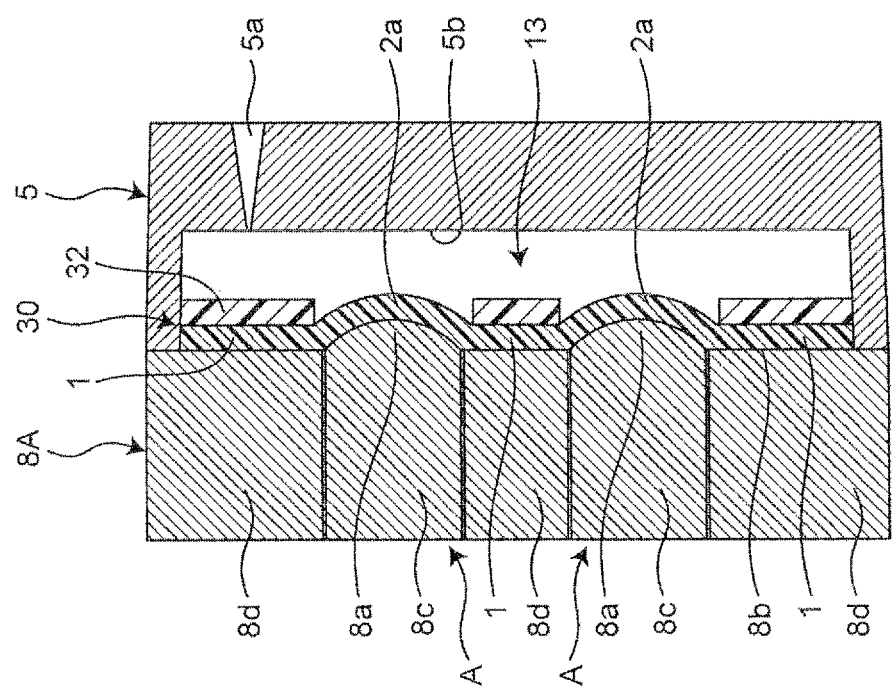
FIG. 16 is a process drawing of the method for manufacturing a membrane switch member according to the modified example.

When each of the extrusion portions 8c is positioned at the protruding position A, as with the previously described movable mold 8, mold clamping (see FIG. 16) and injection molding can be performed.

Figure 17:
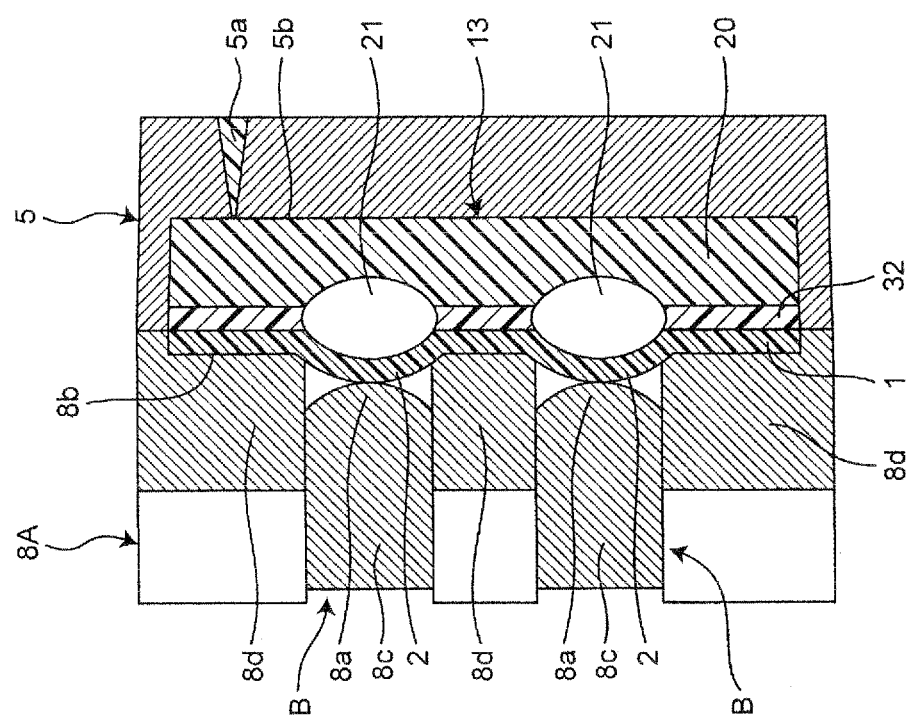
FIG. 17 is a process drawing of the method for manufacturing a membrane switch member according to the modified example.
Figure 18:
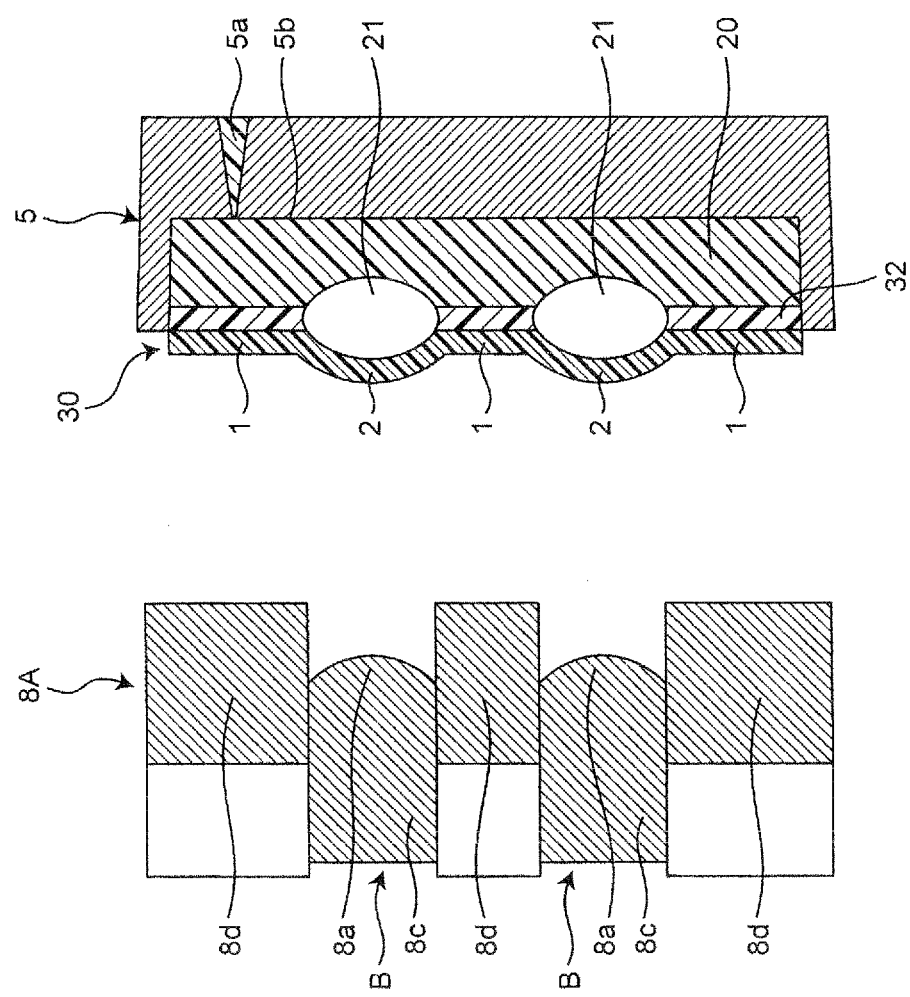
FIG. 18 is a process drawing of the method for manufacturing a membrane switch member according to the modified example.
Figure 19:
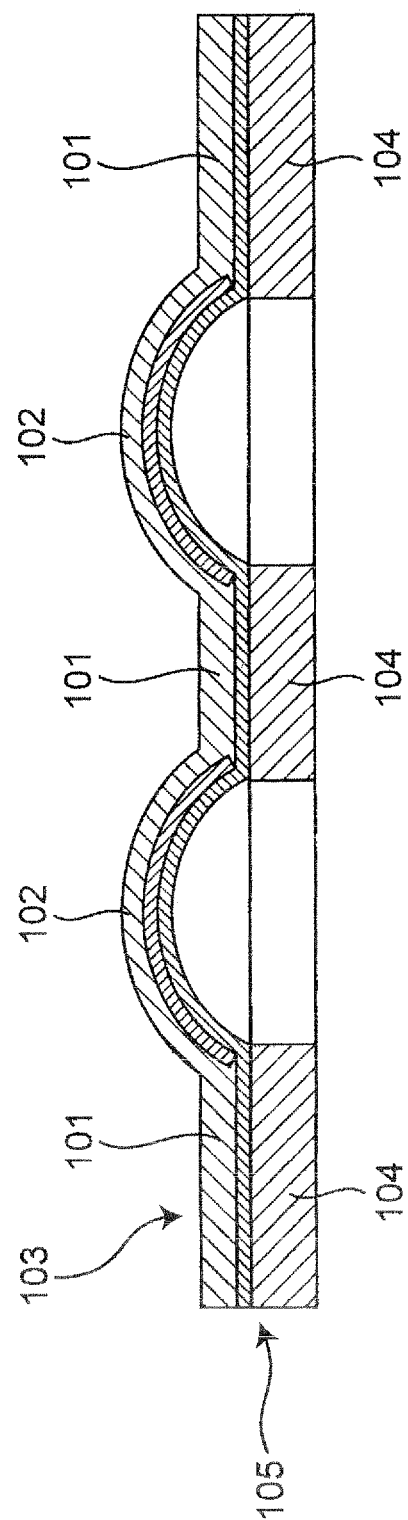
FIG. 19 is an explanatory drawing of a membrane switch sheet used in a method for manufacturing a membrane switch member according to a conventional example.

Then, after the injection molding and before the mold opening, as illustrated in FIG. 17, each of the extrusion portions 8c is retreated with respect to the movable main body portions 8d to the retreated position B. As a result, the mold that had supported the concave portions 2a is no longer present and, thus, the gas bubbles within the molten resin at the contact region between the concave portions 2a and the molten resin are suddenly released, grow, and increase in volume, thus forming the voids 21. This growth of the gas bubbles occurs at the portions where each of the extrusion portions 8c is not present, that is, at the back face of the concave portions 2a. The gas bubbles grow in the back face of the concave portions 2a and, as a result, the spherical or elliptical voids 21 are formed and the concave portions 2a invert to protruding portions 2. Then, as illustrated in FIG. 18, the mold is opened, and the growth of the gas bubbles stops when the resin of the substrate 20 cools and solidifies. When the gas bubble growth stops, the volume of the void 21 becomes fixed.

By retreating each of the extrusion portions 8c to the retreated position B as described above, the voids 21 can be reliably formed at the concave portions 2a.

Note that, conventionally, a weak PP sheet that has not been pre-formed and that has no membrane click feeling has been used as the membrane switch sheet. When using such a PP sheet, by design, portions that stretch to a degree such as to form convex portions as a result of the foaming are formed where the adhesive layer is, in part, absent. However, in this case, convex shapes cannot be formed with the height necessary to provide click feeling by the foaming alone.

In contrast, in the present embodiment, the protruding portions 2 of the membrane switch sheet 3 are out-of-mold formed by a vacuum forming method, an embossing method, or the like, and are pre-formed in a protruding, three-dimensional shape such as a dome shape. As such, for example, in cases where a polyethylene terephthalate sheet with strength, such as a sheet that has membrane click feeling, is used as the membrane switch sheet 3, the sheet can be stretched using only the force of the foaming and, thus, there is no need to form the protruding portions 2 and only the foaming force to invert the convex shape is needed. As such, convex shapes can be reliably formed with the height necessary to provide click feeling. Additionally, the present embodiment can be easily configured in cases where the base film 20 is caused to act as a light guide plate and is configured from a metallic or woodgrain pattern layer that blends with surrounding panels when dark, and through which a character section can be recognized when lit using a back light. In contrast, in conventional cases where the substrate and the switch portion are separate members, it is necessary to avoid the switch portion in order to illuminate the character section, thus leading to further configuration complications.

Additionally, in cases where the protruding portion 2 is formed in a slender/elongated manner such as an elliptical shape or a rectangular shape, operations are possible in which sliding is performed while pressing the protruding portion 2.

Additionally, as depicted by the dot-dash line 14 in FIG. 2, a configuration is possible in which the protruding portions 2 are easily inverted to the concave portions 2a or the concave portions 2a are easily inverted to the protruding portions 2 by heating (e.g. heating to 150° C.) the vicinity of the convex portion cavity forming face 8b using a heater 14 disposed on the movable mold 8 at the time of injection molding.

Note that by appropriately combining any of the embodiments and modified examples of the various embodiments and modified examples described above, the beneficial effects of each of the embodiments and modified examples can be provided. Additionally, combinations of the embodiments, combinations of the examples, and combinations of the embodiments and the examples are possible. Furthermore, combinations of the features of different embodiments or examples are possible.

INDUSTRIAL APPLICABILITY

The method for manufacturing a membrane switch member according to the present invention is useful as a method for manufacturing a membrane switch member that can be caused to function as a switch of a capacitive touch panel even when a protruding portion is pressed in a state where the capacitive touch panel is disposed on the inner face of the membrane switch sheet, and that can be installed in various types of electronic devices in which capacitive touch panels are incorporated.

REFERENCE SIGNS LIST

1 Flat portion
2 Protruding portion

3 Membrane switch sheet
5 Fixed mold
5a Gate
5b Substrate cavity concave portion
8, 8A Movable mold
8a Flat portion cavity forming face
8b Convex portion cavity forming face
8c Extrusion portion
8d Movable main body portion
8e Suction passage
13 Cavity
14 Heater
20 Substrate
21 Void
22 Gas bubble
23 Solid skin layer
24 Core layer
30 Base film
32 Adhesive layer
35 Membrane switch member
36 Electrostatic sensor
37 Membrane switch provided with an electrostatic sensor
39 Membrane switch sheet manufacturing device
40 Injection molding mold
41 Injection molder
41a Mixing area
42 Supercritical fluid generator
43 Supercritical fluid injector
44 Injection unit

The invention claimed is:

1. A method for manufacturing a membrane switch member, the method comprising the steps of:
  preparing a membrane switch sheet including a base film and an adhesive layer, the base film including a flat portion and a semi-spherical or dome shaped protruding portion, the protruding portion being protruded on a front face side of the base film having a uniform thickness, the adhesive layer being formed on a back face of the flat portion of the base film;
  closing a pair of molds
    in a state where the membrane switch sheet is disposed such that the protruding portion contacts a convex portion cavity forming face of a first mold of the pair of molds to invert the protruding portion to a concave portion, and
    in a state where a face on a base film side of the membrane switch sheet is retained on a mold inner face of the first mold, and
    a second mold of the pair of molds defines a cavity between a face of an adhesive layer side of the membrane switch sheet and a mold inner face of the second mold;
  injection-molding by injecting a material including a supercritical fluid gas and a resin material in a mixed state into the cavity of the closed pair of molds; and
  after the injection-molding, releasing mold-clamping and removing the first mold from the second mold for opening the pair of molds and after the removing, causing gas produced from the injection-molded resin to grow on a back face side of the concave portion, thereby causing the protruding portion of the membrane switch sheet to re-invert from a state inverted to the concave portion to a protruded protruding state, and then resulting in manufacturing a membrane switch member in which a void is formed between the protruding portion and an injection molded and cooled-solidified resin layer and the flat portions is adhered to the resin layer by the adhesion layer.

2. The method for manufacturing a membrane switch member according to claim 1, wherein:
  in the injection molding, a vicinity of the convex portion cavity forming face is heated by a heater disposed on the mold.

3. The method for manufacturing a membrane switch member according to claim 1, wherein:
  prior to opening the pair of molds after the injection-molding, the convex portion cavity forming face is retreated from the membrane switch sheet and the protruding portion of the membrane switch sheet is re-inverted from the state inverted to the concave portion to a protruded protruding state.

4. The method for manufacturing a membrane switch member according to claim 2, wherein:
  prior to opening the pair of molds after the injection-molding, the convex portion cavity forming face is retreated from the membrane switch sheet and the protruding portion of the membrane switch sheet is re-inverted from the state inverted to the concave portion to a protruded protruding state.

* * * * *